(12) United States Patent
Bostick et al.

(10) Patent No.: US 9,934,424 B2
(45) Date of Patent: Apr. 3, 2018

(54) AUTOMATED RELATIONSHIP CATEGORIZER AND VISUALIZER

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Sarbajit K. Rakshit, Kolkata (IN); Kimberly G. Starks, Nashville, TN (US)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 14/874,728

(22) Filed: Oct. 5, 2015

(65) Prior Publication Data
US 2017/0098120 A1  Apr. 6, 2017

(51) Int. Cl.
G06K 9/00 (2006.01)
G06T 11/00 (2006.01)
G06T 11/20 (2006.01)

(52) U.S. Cl.
CPC ........ *G06K 9/00288* (2013.01); *G06T 11/001* (2013.01); *G06T 11/20* (2013.01); *G06K 2009/00328* (2013.01)

(58) Field of Classification Search
CPC ...... G06K 9/00288; G06K 2009/00328; G06T 11/001; G06T 11/20
See application file for complete search history.

(56) References Cited

U.S. PATENT DOCUMENTS

| 8,311,278 B2 | 11/2012 | Moore |
| 8,543,573 B2 | 9/2013 | MacPherson |
| 8,798,915 B2 | 8/2014 | Dzubay et al. |
| 9,317,530 B2 * | 4/2016 | Papakipos ......... G06F 17/30247 |
| 2010/0179874 A1 * | 7/2010 | Higgins ............. G06K 9/00664 |
| | | 705/14.53 |

(Continued)

FOREIGN PATENT DOCUMENTS

| WO | WO 2009094142 A1 * | 7/2009 | ............. G06N 5/003 |
| WO | WO2009094142 A1 | 7/2009 | |

(Continued)

OTHER PUBLICATIONS

Wang, Gang, et al. "Seeing people in social context: Recognizing people and social relationships." Computer Vision—ECCV 2010 (2010): 169-182.*

(Continued)

*Primary Examiner* — Aaron W Carter
(74) *Attorney, Agent, or Firm* — Patrick J. Daugherty; Driggs, Hogg, Daugherty & Del Zoppo Co., LPA

(57) ABSTRACT

Aspects differentially drive the graphic display of links overlaid between people in a group photograph as a function of associated relationship type. Individuals are distinguished within the photograph and relationships are identified among the individuals that differ from one another with respect to type of relationship, by extracting relationship data via natural language processing relative to social network data of one or more of the identified individuals. The social network data includes business association data, family data and social network contact data. Thus, a graphic display device is driven to display the identified relationships via each of different overlay elements that are depicted directly on the photograph, link respective ones of the identified individuals, and use different graphic elements to convey differences in respective types of the relationships that are determined among the identified individuals.

20 Claims, 5 Drawing Sheets

(56) References Cited

U.S. PATENT DOCUMENTS

| | | | |
|---|---|---|---|
| 2011/0150273 A1* | 6/2011 | Moore | G06F 17/30265 |
| | | | 382/103 |
| 2011/0213974 A1 | 9/2011 | Ardon et al. | |
| 2012/0158935 A1 | 6/2012 | Kishimoto et al. | |
| 2012/0281911 A1* | 11/2012 | Fung | G06K 9/00677 |
| | | | 382/165 |
| 2013/0198280 A1 | 8/2013 | Liu et al. | |
| 2014/0188594 A1 | 7/2014 | Kritt et al. | |
| 2015/0104060 A1* | 4/2015 | Dolson | G06F 17/30265 |
| | | | 382/100 |
| 2015/0242689 A1* | 8/2015 | Mau | G06F 17/30247 |
| | | | 382/190 |
| 2017/0098120 A1* | 4/2017 | Bostick | G06K 9/00288 |

FOREIGN PATENT DOCUMENTS

| | | | | |
|---|---|---|---|---|
| WO | WO 2012040621 A2 * | 3/2012 | | G06F 17/241 |
| WO | WO2012040621 A2 | 3/2012 | | |
| WO | WO 2014024043 A2 * | 2/2014 | | G06F 17/30247 |
| WO | WO2014024043 A3 | 2/2014 | | |

OTHER PUBLICATIONS

Gallagher, Andrew C., and Tsuhan Chen. "Understanding images of groups of people." Computer Vision and Pattern Recognition, 2009. CVPR 2009. IEEE Conference on. IEEE, 2009.*

Yan-Ying Chen et al, Discovering Informative Social Subgraphs and Predicting Pairwise Relationships from Group Photos, 20th ACM International Conference on Multimedia, MM 2012.

* cited by examiner

AUTOMATED RELATIONSHIP CATEGORIZER AND VISUALIZER

BACKGROUND

Social network sites such as Facebook®, Google+®, Twitter®, LinkedIn®, etc. provide a variety of information to users, including the display of photographs. (FACEBOOK is a trademark of the Facebook Corporation in the United States or other countries; GOOGLE PLUS is a trademark of the Google Corporation in the United States or other countries, TWITTER is a trademark of the Twitter Corporation in the United States or other countries; LINKEDIN is a trademark of the LinkedIn Corporation in the United States or other countries.) Some sites enable users to tag other users that appear in photographs, using the photographs as key indexes to a variety of data associated with the other user, for example linking activity in the different user accounts.

SUMMARY

In one aspect of the present invention, a method for differentially driving a graphic display of links overlaid between people in a group photograph as a function of associated relationship type includes a processor, in response to a publication of a photograph on a social networking website, identifying each of a plurality of different individuals that are each visible within the photograph and distinguished from other ones of the visible individuals. A plurality of relationships are identified among the identified individuals that differ from one another with respect to type of relationship, by extracting relationship data via natural language processing relative to social network data of at least one of the identified individuals. The social network data includes business association data, family data and social network contact data. Thus, a graphic display device is driven to display the identified relationships via each of different overlay elements that are depicted directly on the photograph, link respective ones of the identified individuals, and use different graphic elements to convey differences in respective types of the relationships that are determined among the identified individuals.

In another aspect, a system has a hardware processor in circuit communication with a computer readable memory and a computer-readable storage medium having program instructions stored thereon. The processor executes the program instructions stored on the computer-readable storage medium via the computer readable memory and thereby, in response to a publication of a photograph on a social networking website, identifies each of a plurality of different individuals that are each visible within the photograph and distinguished from other ones of the visible individuals. A plurality of relationships are identified among the identified individuals that differ from one another with respect to type of relationship, by extracting relationship data via natural language processing relative to social network data of at least one of the identified individuals. The social network data includes business association data, family data and social network contact data. Thus, a graphic display device is driven to display the identified relationships via each of different overlay elements that are depicted directly on the photograph, link respective ones of the identified individuals, and use different graphic elements to convey differences in respective types of the relationships that are determined among the identified individuals.

In another aspect, a computer program product for differentially driving a graphic display of links overlaid between people in a group photograph as a function of associated relationship type has a computer-readable storage medium with computer readable program code embodied therewith. The computer readable program code includes instructions for execution which cause the processor to, in response to a publication of a photograph on a social networking website, identify each of a plurality of different individuals that are each visible within the photograph and distinguished from other ones of the visible individuals. A plurality of relationships are identified among the identified individuals that differ from one another with respect to type of relationship, by extracting relationship data via natural language processing relative to social network data of at least one of the identified individuals. The social network data includes business association data, family data and social network contact data. Thus, a graphic display device is driven to display the identified relationships via each of different overlay elements that are depicted directly on the photograph, link respective ones of the identified individuals, and use different graphic elements to convey differences in respective types of the relationships that are determined among the identified individuals.

BRIEF DESCRIPTION OF THE DRAWINGS

These and other features of embodiments of the present invention will be more readily understood from the following detailed description of the various aspects of the invention taken in conjunction with the accompanying drawings in which:

FIG. 4 is a flow chart illustration of a method or process according to an embodiment of the present invention for.

DETAILED DESCRIPTION

Figure 1:
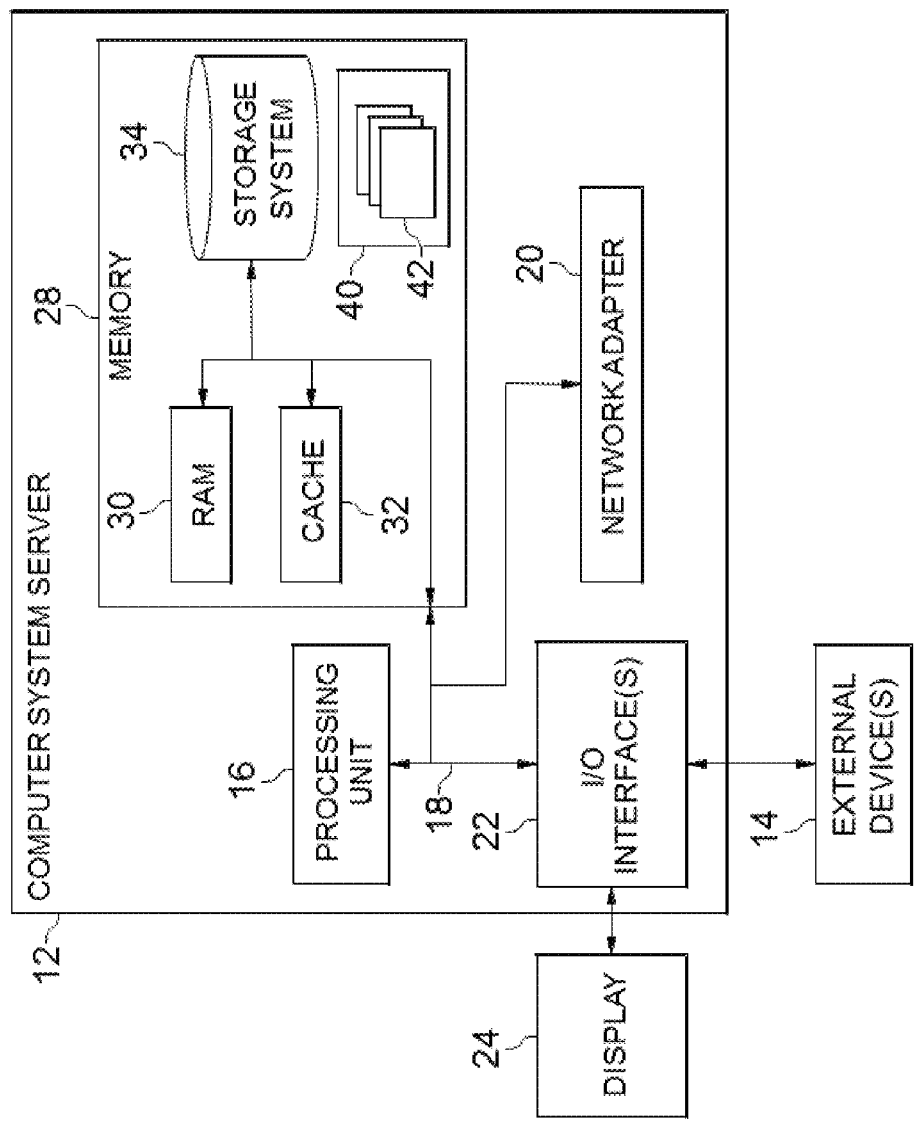
FIG. 1 depicts a cloud computing node according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

FIG. 1 is a schematic of an example of a programmable device implementation 10 according to an aspect of the present invention, which may function as a cloud computing node within a cloud computing environment. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
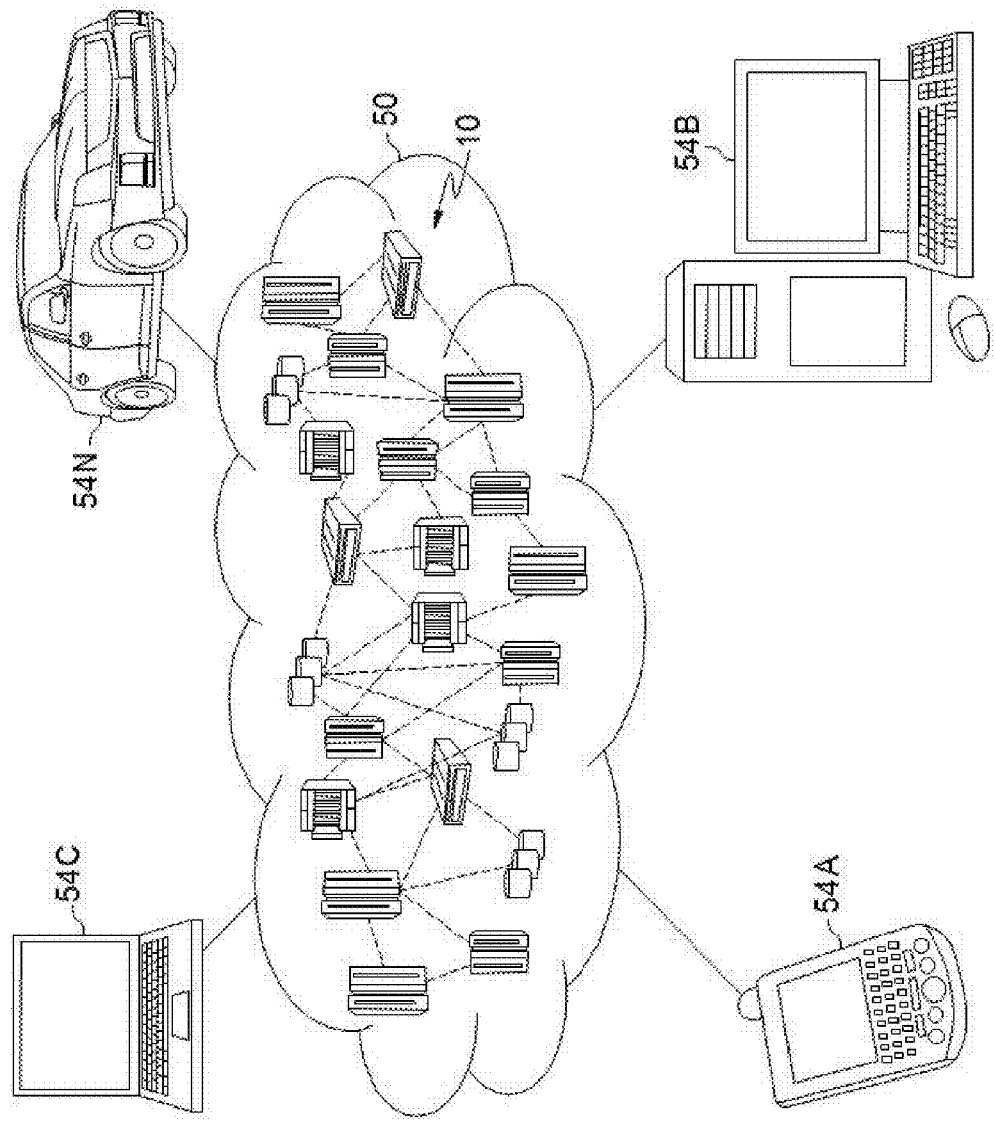
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
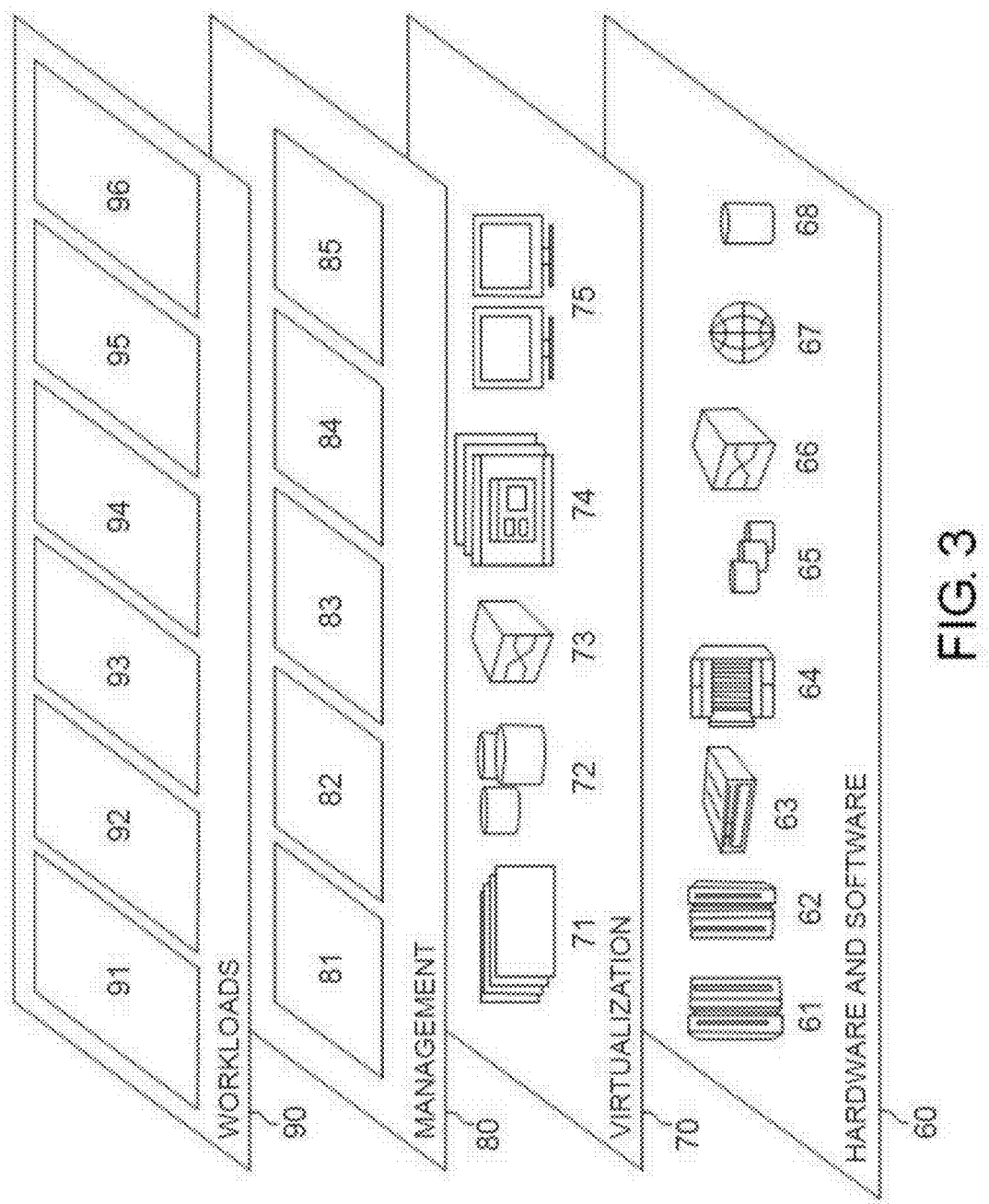
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for differentially driving a graphic display of links overlaid between people in a group photograph as a function of associated relationship type.

Figure 4:
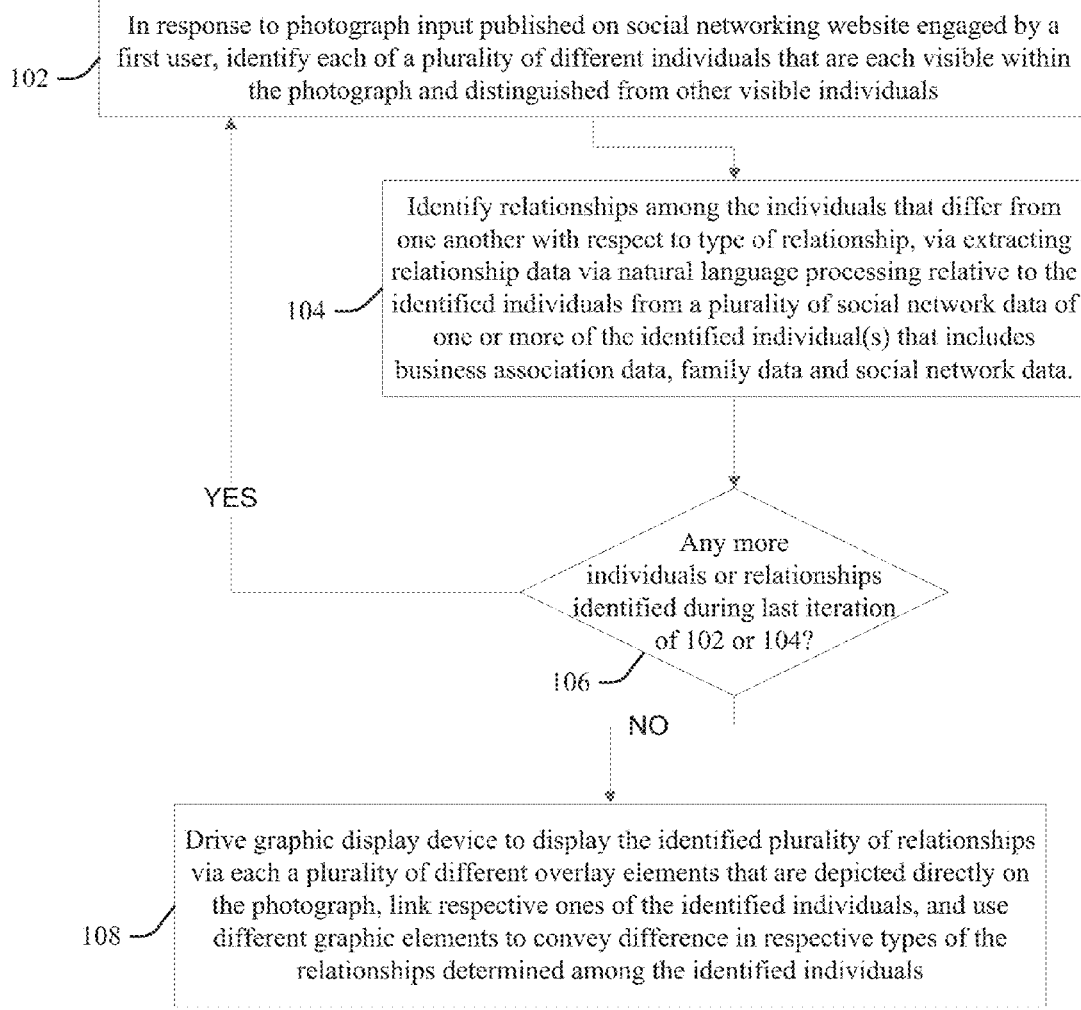

FIG. 4 (or "FIG. 4") illustrates a computer implemented method or process of an aspect of the present invention for differentially driving a graphic display of links overlaid between people in a group photograph (or "photos," pictures, graphic images, etc.) as a function of associated relationship type. A processor (for example, a central processing unit (CPU)) executes code, such as code installed on a storage device in communication with the processor. At 102, in response to an input (publication) of a photograph on a social networking website engaged by a first user via the processor (for example, via executing on an application associated with a log in ID of the first user), the processor identifies each of a plurality of different individuals that are each visible within the photograph and distinguished from other ones of the visible individuals.

The identification at 102 is generally performed by one or more of executing a facial recognition process, and parsing text identifiers saved to metadata of the photograph, such as tag data previously applied to the photograph and saved with photograph metadata, or other types of text data. In some aspects the user opens the photograph within an application executing on a processor that enables relationship functionality through labels or tags applied by the user, for example a dashboard that enables tagging via pulldown selections or text entry into field boxes for application or search.

At 104 the processor identifies a plurality of relationships among the identified individuals that differ from one another with respect to type of relationship. This is accomplished by extracting relationship data relative to the identified individuals via Natural Language Processing from a variety of social network and organizational data that includes: (i) a business association or organization data (company hierarchy, customer list, etc.) that incorporates or is associated with the first user or one or more of the identified individuals; (ii) family data of the first user or identified individuals; and (iii) social network or media friends and contact data of the first user or the identified individuals (LINKEDIN connections, FACEBOOK friends, GOOGLE PLUS circle members, etc.). Some aspect may also include and consider (iv) recreational activity organization data relevant to a membership, activity or recreational activity of the first user or the identified individuals (for example, a sport team roster that the first user or identified individual belongs to or follows or supports); and/or (v) geographic location data of the photograph or a current location or residence of the first user may also be considered, to help identify individuals or likely relationships (for example, the location of a sporting event that includes the sport team as a participant). Still other data sources will be apparent to one skilled in the art.

Annotations or tags of identified individuals within the photograph indicate relationship data on an associated or appropriate social network site, and Natural Language Processing (NLP) is used to extract the relationship data and define relationships at 104. Pre-configuration settings may define streaming data sources for real-time relationship data. Illustrative but not limiting or exhaustive examples include genealogy sites, business networks (LINKEDIN, etc.) and organization structures obtained from web sites of organizations, sporting team, etc. Relationships among the individuals may be automatically determined as a function of metadata associated with the photograph and displayed to the user.

Aspects incorporate dynamic identification of users within photographs from the use of facial recognition or face tagging. When a group photograph is published on a social network and accessed by the user, aspects may update facial recognition of the group photographs in the background at 104 in response to current and most recent tagging activity, without intervention or request by the user. Thus, streaming data sources may be used to obtain the relationship data in real-time for the users identified in the group photo. If existing photos posted on a social site have annotations with relationship data, aspects may use natural language processing to extract the relationship data and define relationship in current photo being analyzed.

At 106, the processor iteratively repeats the steps of identifying individuals and their relationships relative to each other and the first user at 102 or 104, with each subsequent iteration benefiting from the use and application of additional relationship data identified from a previous iteration at 104, until no more individuals or relationships are identified during a last iteration of 102 and 104. This iterative analysis at 106 may be triggered in response to new tagging data inputs from streaming data sources, or triggered by a periodic prompt (for example, refreshing the data every hour, day, or other set period). Thus, an identification of a first individual in the photograph as a teammate or co-worker of the first user in a previous iteration at 104 may result in identification of another, second individual in the photograph as a business associate or customer of the first individual as a function of applying business organization data associated with the first individual in a second iteration at 104.

At 108 the processor drives a display device to display the identified plurality of relationships determined at 104 via each of a plurality of different overlay elements that are depicted directly on the photograph, overlaid on the identified individuals, link respective ones of the identified individuals, and use different graphic elements to convey difference in respective types of the relationships determined among the identified individuals. More particularly, the overlay elements are visually distinguished from one another based on type of relationship, for example by different colors, font, line weights, and framing devices used to link the identified individuals. The visually indicated differences quickly and readily convey to the user the different types and bases on respective ones of the business association/organization data, family data, social network data, recreational activity, organization data and geographic location data. The overlay elements may also indicate where no relationship is found between respective identified individuals.

The visualization of relationships in aspects of the present invention enables different visual depictions and filter rules, depending on context of interest of a person viewing of the photograph of the viewing user, such as family, business, social, sporting team, etc. Data feeds used to define the relationships (for example, at 104, FIG. 4) can be statically defined or dynamic from streaming data source such as organizational structure, genealogy, other photos, via annotation and use of NLP.

In some aspects the display at 108 filters the overlay elements depicted based on security, privacy or preference settings of the first user (or of the device incorporating the driven display. For example, in response to recognizing a current public setting of the display device, or a viewing of the photograph by a family member, business relationship overlays may be suppressed or otherwise omitted from display at 108, wherein the display depicts only family and friend relationships, or only family relationships, or the identified individuals. In such aspects the first user may define who can view which overlay relationships, and in which of different contexts.

Social network sites enable users to tag other users that appear in photographs, and thereby use the photographs as key indexes linking a variety of data associated with the other user, for example linking activity in the different user accounts. However, the usefulness of such tagging is limited within such sites with respect to other users who may not be linked to or otherwise cognizant of some of the tagged users, and thereby may not be informed of the tags or otherwise informed of relationships between different people in the photos. Aspects of the present invention provide methods and systems that analyze and display the relationship of people in a group photo posted on a social network to others who may not be directly linked to or otherwise cognizant of one or more of the depicted people, thereby enhancing the social networking capabilities of an individual site. The display of this information may be selective and dependent on the nature of the connection (personal, family, friends, business, etc.) relative to permissions for a viewer (second user) viewing the photograph.

Some aspects use understanding of the relationships determined for people in a group photo to perform targeted advertising of goods and services. Cross-selling may be a natural extension of targeted advertising, and based on key data points determined relative to the users and individuals identified in the photos, such as birthdays, holidays, sporting event records (big game wins), etc.

Social networking sites may enable users to define family relationships, for example through a pull down menu of options for tags to apply to a photograph (sister, brother, father, grandmother, cousin, aunt, uncle, etc.). From multiple places group photographs may be captured and shared via one or more social networking sites. However, if a friend of the user views the photograph, they may not be aware or understand the relationships of the people in the photograph. Aspects provide for methods and systems by which a user can visualize the relationships of people in the group photograph to provide greater context and understanding to extended users. For example, other social network users may provide comments or specific data relevant to a relationship, via accessing the photograph on a social network application used by the first user to acquire or display the photograph (at 102, FIG. 4).

Figure 5:
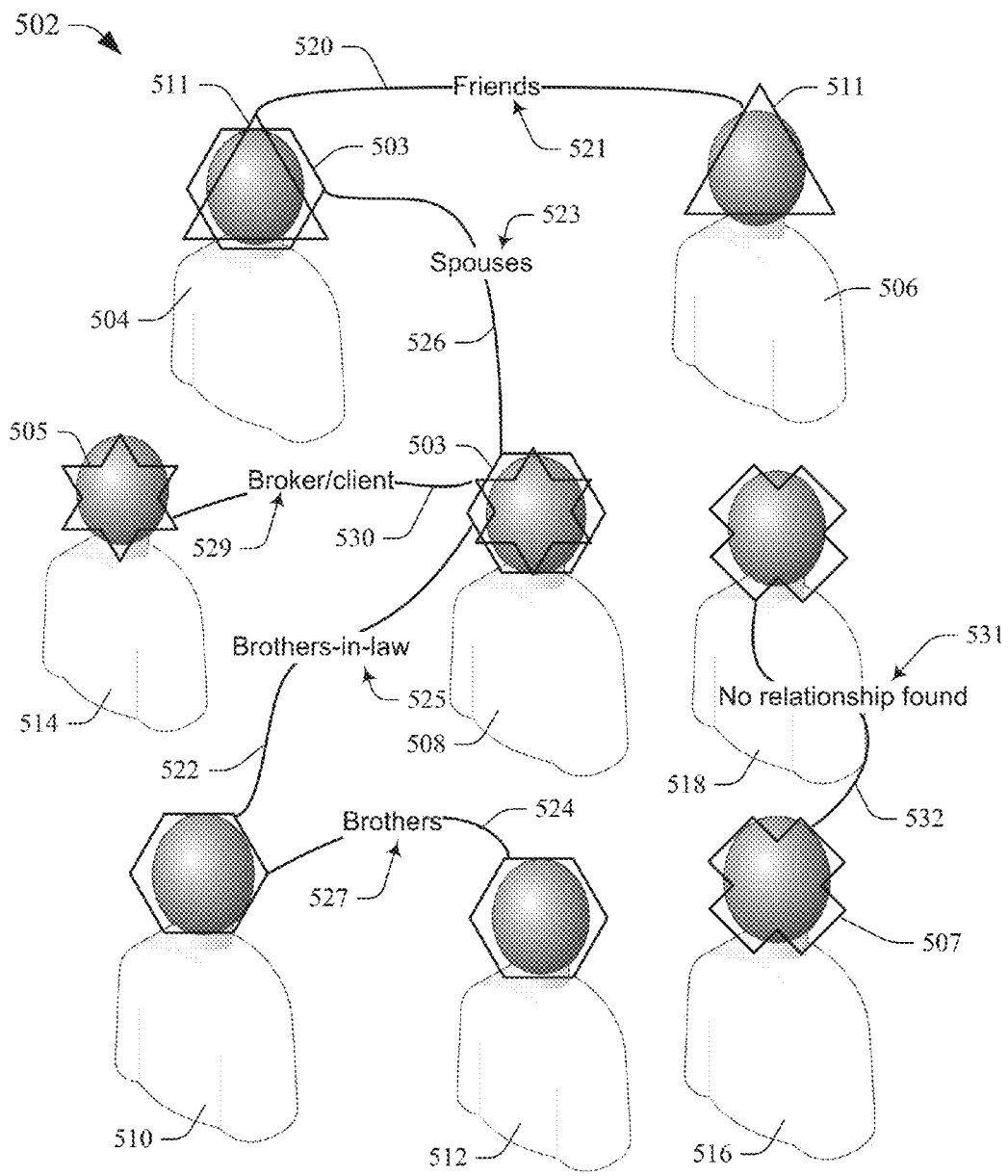
FIG. 5 is a graphic illustration of an example of a driven display of a graphic device according to an embodiment of the present invention.

Aspects use specific and informative linking overlays to directly link people in a group photo with graphic elements that clearly convey the nature of relationships between the people, wherein the comments may be grouped and selectively displayed based on relationship type relative to a view status. FIG. 5 provides an illustration of a view of a group photograph 502 that is published to a social networking site, wherein a user has the option to enable the display of different relationships between individuals that are identified within the photograph 502 (as determined at 104, FIG. 4). The relationships are each depicted by a plurality of different respective overlay elements that each describes different relationships between respective indicated pairs of the individuals.

More particularly, a "Friends" 520 overlay links individuals 504 and 506 and indicates that they are friends by the use of a text label 521 "Friends" and triangular frames 511 that are disposed about or onto each person 504 and 506 at respective ends of the Friends 520 overlay.

A "Spouses" 526 overlay links individuals 504 and 508 and indicates that the type of their relationship is "family" by the linking to hexagonal frames 503 that are disposed about or onto each person 504 and 508. The different shapes of the frames 511 and 503 quickly convey differences in the relationship type (friends vs family). The relationship subtype within the genus of "family," here "spouses" is conveyed by the text label 523 "Spouses."

Other family overlay links Brothers 524 and Brothers-in-law 522 also convey their relationship is "family" by the linking to the hexagonal frames 503 that are disposed about or onto each respective person 508, 510 and 512. The different relationship subtypes of the family overlays 526, 524 and 522 are conveyed by the different respective text labels 523, 525 and 527.

Business relationship overlay 530 is distinguished as to type from the friends and family overlays 520/526/524 via use of a different, third "star" frame shape 505. The specific subtype of the business relationship linking the individuals 508 and 514, "Broker-Client," is conveyed by the text label 529.

The present aspect also provides for positive indications of a failure to find a relationship. This may be inferred from depicting no overlay frame element or connection to the individuals 516 and 518. Or it may be positively called out via use of the "No relationship found" overlay line 532, which uses another, different (fourth) "X" frame shape 507. The specific explanation or failure of the relationship determination is conveyed by the text label 531.

In some aspects the user can select any of the overlay relationship links 520/522/524/526/530/532 and provide social network feedback, for example a "Like" or a comment ("newly married in 2015"), etc.

The display of the overlay relationship links 520/522/524/526/530/532 may be filtered in response to security settings or context definitions for relationships to be displayed. For example, the user may make a selection from a "Show Relationships" drop-down menu choice in a graphical user interface to display or specifically exclude any one or all of the family, business, friends links, as well as other links not shown in this example (LINKEDIN contact, sporting team teammate, etc.), in some examples as a function of the viewing status of the other viewer. Thus, a selection of "show family relationships to family" by a user viewing or posting the photograph 502 view as depicted by FIG. 5 may enable family members viewing the same photograph 502 via the same or another social networking site to see the family relationship overlays 522, 524 and 526, but not the business relationship overlay 530 or the Friends overly 520. A selection of "show all to all" will allow any user to see all of the overlay relationship links 520/522/524/526/530/532. A selection of "show business overlays only to business clients" may restrict the display of the Broker-Client overlay 530 to only those users linked to the first user as a business contact (for example, via LINKEDIN, GOOGLE PLUS, FACEBOOK, etc.).

Thus, aspects enable user to determine and post a wide variety of relationships between the individuals 504, 506, 508, 510, 512, 514, 516 and 518, each of which may be selectively displayed to other users based on their status relative to the user.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for differentially driving a graphic display of links overlaid between people in a group photograph as a function of associated relationship type, the method comprising executing on a computer processor the steps of:

in response to a publication of a photograph on a social networking website, identifying each of a plurality of different individuals that are each visible within the photograph and distinguished from other ones of the visible individuals;

identifying relationships among the identified individuals by extracting relationship data via natural language processing relative to social network data of at least one of the identified individuals, wherein the social network data comprises business association data, family data and social network contact data; and in response to determining that a plurality of the identified relationships differ from one another with respect to a type of relationship that is selected from the group consisting of family, friend and business contact relationships, driving a graphic display device to display the identified plurality of relationships via each of a plurality of different overlay elements that are depicted directly on the photograph and link respective ones of the identified individuals and each comprise text labels indicating respective ones of the types of relationship identified for the linked individuals, wherein each of the different overlay elements use different graphic elements with respect to others of the different overlay elements to convey differences in the respective ones of the types of the relationships that are determined among the identified individuals relative to the others of the different overlay elements, and wherein the different overlay elements are visually distinguished from one another based on differences in respective ones of the types of relationship by using different visual elements that are chosen from the group consisting of different colors, different fonts, different line weights, and different framing device, of the overlay elements that link respective ones of the identified individuals.

2. The method of claim 1, further comprising identifying each of the plurality of different individuals via at least one of executing a facial recognition process, and parsing text identifiers saved to metadata of the photograph.

3. The method of claim 1, further comprising identifying relationships among the individuals relative to a first user viewing the publication of the photograph on the social networking website.

4. The method of claim 1, further comprising:

in response to determining an absence of any of the plurality of the different relationships among first and second ones of the identified individuals, driving the graphic display device to display another overlay element that is depicted directly on the photograph and links the first and second ones of the identified individuals, and comprise a text label indicating that none of the plurality of the different relationships links the first and second ones of the identified individuals, and uses another different graphic element that is visually distinguished from each of the plurality of different overlay elements by using one of the visual elements that is different from the visual elements of each of the plurality of different overlay elements to thereby convey that the step of identifying the relationships among the identified individuals determined no relationship among the first and second ones of the identified individuals.

5. The method of claim 1, further comprising:

in response to determining that a relationship of a viewer of the photograph on the social networking website via the graphic display device to a poster of the photograph on the social networking website is one of the types of the relationship selected from the plurality of different relationships, filtering the displayed overlay elements to thereby drive the graphic display device to display only those of the plurality of different overlay elements that are associated with the determined relationship of the viewer to the poster.

6. The method of claim 1, wherein the plurality of social network data of the at least one of the identified individuals further comprises at least one of:

a roster of a sport team that is relevant to a membership, activity or recreational activity of the at least one of the identified individuals; and a geographic location data of the photograph that is associated with a sporting event that includes the sport team as a participant.

7. The method of claim 1, further comprising:

integrating computer-readable program code into a computer system comprising the processor, a computer readable memory in circuit communication with the processor, and a computer readable storage medium in circuit communication with the processor; and wherein the processor executes program code instructions stored on the computer-readable storage medium via the computer readable memory and thereby performs the steps of identifying each of the plurality of different individuals that are each visible within the photograph and distinguished from other ones of the visible individuals, identifying the relationships among the identified individuals that differ from one another with respect to the type of relationship, and driving the graphic display device to display the identified plurality of the relationships via each of the plurality of different overlay elements that are depicted directly on the photograph.

8. A system, comprising:

a processor;

a computer readable memory in circuit communication with the processor; and a computer readable storage medium in circuit communication with the processor, wherein the processor executes program instructions stored on the computer-readable storage medium via the computer readable memory and thereby:

in response to a publication of a photograph on a social networking website, identifies each of a plurality of different individuals that are each visible within the photograph and distinguished from other ones of the visible individuals;

identifies relationships among the identified individuals by extracting relationship data via natural language processing relative to social network data of at least one of the identified individuals, wherein the social network data comprises business association data, family data and social network contact data; and in response to determining that a plurality of the identified relationships differ from one another with respect to a type of relationship that is selected from the group consisting of family, friend and business contact, drives a graphic display device to display the identified plurality of relationships via each of a plurality of different overlay elements that are depicted directly on the photograph and link respective ones of the identified individuals and each comprise text labels indicating respective ones of the types of relationship that link the individuals, wherein each of the different overlay elements use different graphic elements with respect to others of the different overlay elements to convey differences in respective types of the linking relationships that are determined among the identified individuals, wherein the different overlay elements are visually distinguished from one another based on differences in respective types of linking relationship by using different visual elements that are chosen from the group consisting of different colors, different fonts, different line weights, and different framing devices of the overlay elements that link respective ones of the identified individuals.

9. The system of claim 8, wherein the processor executes the program instructions stored on the computer-readable storage medium via the computer readable memory and thereby identifies each of the plurality of different individuals via at least one of executing a facial recognition process, and parsing text identifiers saved to metadata of the photograph.

10. The system of claim 8, wherein the processor executes the program instructions stored on the computer-readable storage medium via the computer readable memory and thereby identifies relationships among the individuals relative to a first user viewing the publication of the photograph on the social networking website.

11. The system of claim 8, wherein the processor executes the program instructions stored on the computer-readable storage medium via the computer readable memory and thereby, in response to determining an absence of any of the plurality of the different relationships among first and second ones of the identified individuals, drives the graphic display device to display another overlay element that is depicted directly on the photograph and links the first and second ones of the identified individuals, and comprises a text label indicating that none of the plurality of the different relationships links the first and second ones of the identified individuals, and uses another different graphic element that is visually distinguished from each of the plurality of different overlay elements by using one of the visual elements that is different from the visual elements of each of the plurality of different overlay elements to thereby convey that the identification of the relationships among the identified individuals determined no relationship among the first and second ones of the identified individuals.

12. The system of claim 8, wherein the processor executes the program instructions stored on the computer-readable storage medium via the computer readable memory and thereby, in response to determining that a relationship of a viewer of the photograph on the social networking website via the graphic display device to a poster of the photograph on the social networking website is one of the types of the relationship selected from the plurality of different relationships, filters the displayed overlay elements to thereby drive the graphic display device to display only those of the plurality of different overlay elements that are associated with the determined relationship of the viewer to the poster.

13. The system of claim 8, wherein the plurality of social network data of the at least one of the identified individuals further comprises at least one of:
a roster of a sport team that is relevant to a membership, activity or recreational activity of the at least one of the identified individuals; and
a geographic location data of the photograph that is associated with a sporting event that includes the sport team as a participant.

14. The system of claim 8, wherein software comprising the program instructions is provided as a service in a cloud environment.

15. A computer program product for generating an interactive plotted electronic map presentation which depicts historical progression of events of a news story incident as a function of topic, the computer program product comprising:

a computer readable storage medium having computer readable program code embodied therewith, wherein the computer readable storage medium is not a transitory signal per se, the computer readable program code comprising instructions for execution by a processor that cause the processor to:

in response to a publication of a photograph on a social networking website, identify each of a plurality of different individuals that are each visible within the photograph and distinguished from other ones of the visible individuals;

identify relationships among the identified individuals by extracting relationship data via natural language processing relative to social network data of at least one of the identified individuals, wherein the social network data comprises business association data, family data and social network contact data; and in response to determining that a plurality of the identified relationships differ from one another with respect to a type of relationship that is selected from the group consisting of family, friend and business contact, drive a graphic display device to display the identified plurality of relationships via each of a plurality of different overlay elements that are depicted directly on the photograph and link respective ones of the identified individuals and each comprise text labels indicating respective ones of the types of relationship identified for the linked individuals, wherein each of the different overlay elements use different graphic elements with respect to others of the different overlay elements to convey differences in respective types of the relationships that are determined among the identified individuals relative to the others of the different overlay elements, and wherein the different overlay elements are visually distinguished from one another based on differences in respective ones of the types of relationship by using different visual elements that are chosen from the group consisting of different colors, different fonts, different line weights, and different framing devices of the overlay elements that link respective ones of the identified individuals.

16. The computer program product of claim 15, wherein the computer readable program code instructions for execution by the processor further cause the processor to identify each of the plurality of different individuals via at least one of executing a facial recognition process, and parsing text identifiers saved to metadata of the photograph.

17. The computer program product of claim 15, wherein the computer readable program code instructions for execution by the processor further cause the processor to identify relationships among the individuals relative to a first user viewing the publication of the photograph on the social networking website.

18. The computer program product of claim 15, wherein the computer readable program code instructions for execution by the processor further cause the processor to, in response to determining an absence of any of the plurality of the different relationships among first and second ones of the identified individuals, drive the graphic display device to display another overlay element that is depicted directly on the photograph and links the first and second ones of the identified individuals, and comprises a text label indicating that none of the plurality of the different relationships links the first and second ones of the identified individuals, and uses another different graphic element that is visually distinguished from each of the plurality of different overlay elements by using one of the visual elements that is different from the visual elements of each of the plurality of different overlay elements to thereby convey that the identification of the relationships among the identified individuals determined no relationship among the first and second ones of the identified individuals.

19. The computer program product of claim 15, wherein the computer readable program code instructions for execution by the processor further cause the processor to distinguish each of the plurality of the overlay elements from one another based on type of relationship by using different visual elements for each of the plurality of the overlay elements that are chosen from the group consisting of different colors, different fonts, different line weights, and different framing devices of the overlay elements that link respective ones of the identified individuals.

20. The computer program product of claim 15, wherein the computer readable program code instructions for execution by the processor further cause the processor to, in response to determining that a relationship of a viewer of the photograph on the social networking website via the graphic display device to a poster of the photograph on the social networking website is one of the types of the relationship selected from the plurality of different relationships, filter the displayed overlay elements to thereby drive the graphic display device to display only those of the plurality of different overlay elements that are associated with the determined relationship of the viewer to the poster.

\* \* \* \* \*